_Patented Apr. 4, 1950_

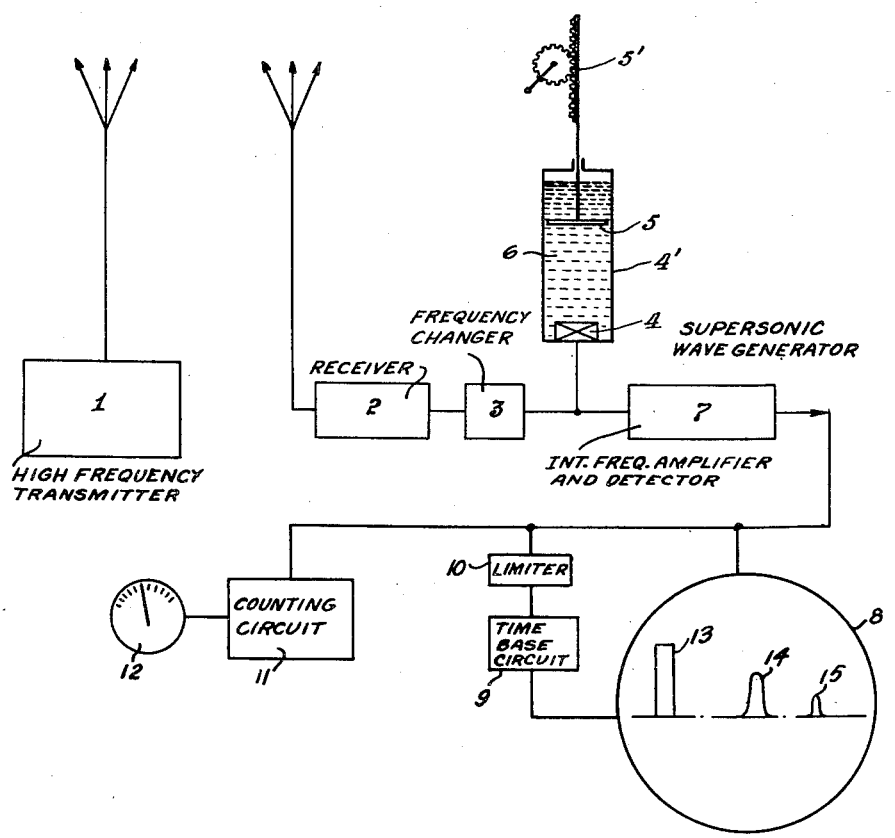

2,502,464

UNITED STATES PATENT OFFICE 2,502,464

APPARATUS FOR DETERMINING THE SPEED OF A DISTANT OBJECT

Gerard J. Lehmann, New York, N. Y., assignor to International Standard Electric Corporation, New York, N. Y., a corporation of Delaware Application November 15, 1943, Serial No. 510,316
In France June 4, 1942

Section 1, Public Law 690, August 8, 1946
Patent expires June 4, 1962

3 Claims. (Cl. 343—8)

The present invention relates to devices and methods for making measurements and investigations by means of electromagnetic waves. A particular object of the invention is to provide a method of and an apparatus for determining the distance from a given point of an object that reflects the electromagnetic waves and the speed of bodily displacement towards or away from said point.

It has already been proposed to make use of the Doppler-Fizeau effect in measuring the speed of displacement, and also to send out impulses of electromagnetic waves and measure their outward and return time of travel, in order to calculate the distance of the reflecting object.

It is known that if $v$ is the speed of approach of a reflecting object, the interference between the transmitted and reflected waves will give rise to heterodyne beats. As already known, the frequency variation $\Delta F$ due to the Doppler-Fizeau effect is:

$$\Delta F = 2v\frac{F}{c} = \frac{2v}{\lambda}$$

F being the frequency of the transmission, c the speed of propagation of the waves, and $\lambda$ the wavelength.

The beat of the transmitted wave F with the reflected wave whose frequency has varied by $\Delta F$ as a result of the Doppler-Fizeau effect has, accordingly, a frequency equal to $\Delta F$. On account of the very low value of $\Delta F$ with respect to F, it is highly desirable to use ultra short waves so as to increase the absolute value of $\Delta F$ and so as to make it more easily measurable, and it is also highly important that the transmission frequency with which the reflected frequency yields heterodyne beats, shall not have varied during the time taken by the reflected wave to reach the reflecting object and return to the transmitting set.

One of the objects of this present invention is the providing of means for reducing or eliminating the influence of the frequency variations of the transmitting set emitting the measuring waves.

According to a feature of the invention, a retardation device, such as an artificial line, is associated with the direct path of connection between the transmitter and the receiver so that a beat will take place between two waves that originate at the transmitter at the same moment, one being received after reflection from a target and the other being received directly and delayed in the retardation device, thus eliminating the frequency modulation effect that always exists to a certain extent in ultra short wave generators.

According to another feature of the invention, the transmission may not be continuous but discontinuous; in other words, the transmission may be in the form of pulses of short time duration.

According to another feature of the invention, the device for measuring the speed of displacement is combined with the device for measurement of the distance by the sending out of trains of impulses.

According to another feature of the invention, the retardation circuit disposed in the path of the direct wave, is the same as that which serves for determination of the distance.

According to other features of the invention, the retardation circuit may be disposed before or after a frequency changer and may consist of an electromechanical arrangement, such as a piezoelectric system or an elastic medium traversed by supersonic pulses or waves.

This invention will now be explained in connection with the description of an embodiment hereinafter described, reference being made to the drawing hereunto attached.

In the drawing there is schematically indicated at 1, a transmitter of high frequency waves adapted to transmit waves into space where they may be intercepted and reflected back by the target, such as an airplane; at 2, is shown a receiver of these waves for receiving both the direct waves from the transmitter and the waves reflected from a target. This receiver may include suitable amplifying arrangements, as well-known in the art. At 3 is indicated a frequency changer, likewise of any suitable type to reduce the received waves to a lower intermediate frequency. The output of element 3 actuates a supersonic wave generator 4, which may be of the quartz or other piezoelectric type. A vessel 4' contains a suitable liquid 6, through which the supersonic waves pass to reflector 5, the distance between elements 4 and 5 being adjustable by any suitable mechanical means, e. g. the rack and pinion equipped with the hand crank indicated at 5'.

The respective outputs of frequency changer 3 and of the crystal 4, when actuated by the reflected supersonic wave, are superposed and impressed upon an intermediate frequency amplifier and detector 7, the output of which may be measured by any suitable means as well-known in the art.

For instance, the detected output from the detector 7 may lead to the vertical deflection circuit of a horizontal oscilloscope 8 whose horizontal deflection circuit is operated by a time-base circuit 9 controlled by the main impulse received directly from the transmitter. The time-base circuit 9 may thus be connected to the output of the amplifier and detector 7 through a suitable limiter 10 which causes it to respond to pulses above a predetermined level only.

The output of the amplifier and detector 7 is also connected to a known device 11 for counting the beats between the two reflected signals, and the output of this counting device is arranged to operate a known indicator 12 which will read the beat frequency directly in terms of target speed, as will be hereinafter explained. The devices 8, 9 and 10 and their manner of connection to a signal source such as the device 7 are well known in the prior art and are illustrated herein merely by way of example.

In the hereinafter-described embodiment, the Doppler effect is observed on pulses of slight duration that may be utilized for simultaneous determination of the distance in accordance with already known methods.

In the disclosure, a supersonic device is utilized for the retardation effect. It is, however, evident that the present invention may make use of retardation devices, such as other kinds of artificial lines.

The mode of operation of my invention is as follows: At the time $t=0$, the transmitter 1 generates a high power high frequency train of waves or pulses. This pulse of waves impresses by direct radiation the antenna of receiver 2 which transmits it via a suitable amplifier to the frequency changer 3. At the time $t=0$, there accordingly issues from the frequency changer a pulse of intermediate-frequency waves which is converted into a train of elastic waves by the supersonic wave generator 4, and from the transmitter there issues a high power pulse of radio waves in the direction of the moving object, the speed and the distance of which it is desired to measure. These two pulses of waves both travel over their respective paths, the pulse of intermediate-frequency elastic waves traveling from the supersonic wave quartz generator 4 through the liquid 6 to the adjustable reflector 5 and back again through the liquid 6 to the generator 4, and the pulse of high power radio waves from the transmitter traveling to the moving object and back to the receiver 2.

These two echo pulses, together with the main pulse received directly from the transmitter are delivered to the intermediate frequency amplifier and detector 7 and the output of the detector 7 is delivered to the vertical deflecting circuit of the oscilloscope 8. Thus whenever any of the pulses appear in the output of the amplifier and detector 7 the spot of light on the face of the oscilloscope will be caused to move vertically a distance depending on the energy of the particular pulse. The main pulse transmitted directly from the transmitter, appearing in the output of the amplifier and detector 7, is caused to control the horizontal deflecting circuit by means of the known time-base circuit 9. Thus, the light spot will be caused to start, for instance, from the left side of the oscilloscope when the main pulse is received and to continue at a constant rate toward the right side, the limiter 10 preventing the operation of the time-base circuit by any pulse except the main pulse which is always stronger than any other.

As the spot of light starts to sweep to the right across the face of the oscilloscope it is first moved vertically by the main pulse received directly from the transmitter to produce an indication 13 which thus appears at the left side of the oscilloscope. After the supersonic waves produced by this main pulse have traveled up through the liquid 6 to the reflector 5 and back again to the crystal 4, the echo pulse will produce a vertical deflection of the light spot on the oscilloscope as indicated at 14. During this time the main pulse has been traveling out toward the target and after a period of time is reflected back and the reflected pulse is received by the receiver and appears in the output of the intermediate frequency amplifier and detector 7 and will produce an indication 15 on the face of the oscilloscope.

If the distance of the reflector 5 is adjusted by means of the handcrank so as to give the path of the supersonic waves a duration equal to that of the path of the radio waves, the quartz crystal 4 will register the elastic wave echo at the same moment at which the radio wave echo coming from the antenna is transmitted by the frequency changer, and the indication 14 will move over to coincide with the indication 15. Since the wave frequency of the two reflected or echo pulses, that reflected from the target and that reflected in the supersonic system, will differ in accordance with the Doppler-Fizeau effect in proportion to the speed of the target towards or away from the transmitter, the beat frequency between the two echoes will be a measure of the speed of the target, as will be explained below.

The output of the amplifier and detector 7 containing this beat frequency is then delivered to the counting device 11 where the beat frequency is translated into a voltage, for instance, which is then applied to the indicating device 12 arranged to indicate the beat frequency in terms of speed.

The manner in which this beat frequency may be translated into terms of speed of the target may be explained as follows: Assuming that $F_0$ is the base frequency of the transmitter
$F_H$ is the frequency of the local heterodyne of the receiver, and
$F_I$ is the intermediate frequency, we get:

(1) $$F_I = F_0 - F_H$$

Assuming that C is the speed of propagation of the electro-magnetic waves, $e$, the speed of propagation of the elastic waves,
D, the distance of the actual target from the transmitter, and
$f$, the distance of the supersonic mirror, from the supersonic wave generator, then the condition of coincidence of the echoes can be written as:

(2) $$\frac{D}{C} = \frac{f}{e}$$

Assuming that $vr$ is the speed of approach of the target, and W, the speed of approach of the supersonic reflector to the supersonic wave generator, then, since the condition of coincidence of the echoes is maintained steadily by the operator of the apparatus, we get:

(3) $$\frac{vr}{C} = \frac{W}{e}$$

The Doppler-Fizeau radio wave effect causes a frequency variation of $\Delta F$ in the radio waves received by the receiving antenna. Thus we get:

$$\Delta F = \frac{2vr}{C} F_0$$

$\Delta F$ is an alteration of the frequency of the reflected waves at frequency $F_0$; after passing into the frequency changer and owing to the known properties of this latter, the alteration $\Delta F$ still exists without modification in the intermediate frequency signal. The value of the frequency of the radio wave echo is accordingly:

(4) $$F_I + \Delta F = F_I + \frac{2vr}{C} F_0$$

The Doppler-Fizeau effect due to the movement of the supersonic reflector impresses on the frequency of the elastic wave echo an alteration of (5) $$\Delta p = \frac{2W}{e} F_I$$

In line with relation (3), this may be written as:

$$\Delta p = \frac{2vr}{C} F_I$$

and from this we finally get:

(6) $$\Delta p = \Delta F \times \frac{F_I}{F_0}$$

One is therefore in a position to calculate the frequency of the beat note, its value being $$B = \Delta F - \Delta p = \frac{2vr}{C}(F_0 - F_I)$$

and from this finally:

(7) $$B = \frac{2vr}{C} \times F_H$$

From the frequency of the beat note, it is accordingly possible directly to determine the actual speed of approach of the moving object $vr$.

It is evident that the present invention may be given other embodiments that will be apparent to those skilled in the art.

What is claimed is:

1. A system for determining the component of speed of a moving object towards or away from a given observation station comprising means for transmitting spaced pulses of high frequency electric-energy towards said object, means for receiving pulse energy directly from said transmitting means and echo energy reflected from said object, a supersonic-wave generator connected to be energized from said receiving means having input and output means, means for producing an echo of the wave energy of said generator for re-excitation thereby, means for adjusting said echo producing means to produce coincidence of the received echo of said transmitting means and of said wave energy echo-reexcited generator at said output means, and means for detecting the beat frequency produced by the interaction of said two echoes.

2. A system according to claim 1, wherein said means for producing an echo of the wave energy of said generator includes means forming a fluid medium path of propagation and an energy reflecting target in said path, and said echo adjusting means comprises means for moving said target to and fro with respect to said generator.

3. A method for determining the component of speed of a moving object towards or away from a given observation station comprising producing an echo of pulses of high frequency wave energy with respect to the object to be detected, locally producing a second echo of the wave energy pulses and obtaining the beat frequency of the two echoes as a measure of the speed of the object toward or away from the point of observation.

GERARD J. LEHMANN.

REFERENCES CITED

The following references are of record in the file of this patent:

UNITED STATES PATENTS

| Number | Name | Date |
|---|---|---|
| 1,495,616 | Simpson | May 27, 1924 |
| 1,864,638 | Chilowsky | June 28, 1932 |
| 1,924,174 | Wolf | Aug. 29, 1933 |
| 1,945,952 | Nicolson | Feb. 6, 1934 |
| 2,157,178 | Kellogg | May 9, 1939 |
| 2,263,902 | Percival | Nov. 25, 1941 |
| 2,407,000 | Evans | Sept. 3, 1946 |
| 2,407,294 | Shockley et al. | Sept. 10, 1946 |
| 2,408,742 | Eaton | Oct. 8, 1946 |
| 2,423,023 | Hershberger | June 24, 1947 |

FOREIGN PATENTS

| Number | Country | Date |
|---|---|---|
| 552,072 | Great Britain | Mar. 22, 1943 |
| 357,957 | Great Britain | Sept. 21, 1931 |

OTHER REFERENCES

Bureau of Standards Journal of Research, vol. 8, January 1932, Research Paper 402, pp. 79 to 96.